United States Patent
Steblau

(10) Patent No.: US 9,623,474 B2
(45) Date of Patent: Apr. 18, 2017

(54) SPLIT BEARING CAGE FOR ROLLING ELEMENT BEARING

(75) Inventor: Dieter Steblau, Würzburg (DE)

(73) Assignee: AKTIEBOLAGET SKF, Gothenburg (SE)

( * ) Notice: Subject to any disclaimer, the term of this patent is extended or adjusted under 35 U.S.C. 154(b) by 405 days.

(21) Appl. No.: 13/472,629

(22) Filed: May 16, 2012

(65) Prior Publication Data

US 2013/0308890 A1    Nov. 21, 2013

(51) Int. Cl.
*F16C 33/46* (2006.01)
*B21D 53/12* (2006.01)

(52) U.S. Cl.
CPC .......... *B21D 53/12* (2013.01); *F16C 33/4635* (2013.01); *F16C 33/4694* (2013.01); *F16C 2226/74* (2013.01); *F16C 2361/53* (2013.01); *F16C 2361/61* (2013.01); *Y10T 29/49691* (2015.01)

(58) Field of Classification Search
CPC .. F16C 33/50; F16C 33/4694; F16C 33/4652; F16C 2226/74; F16C 2226/12; F16C 2226/70; F16C 2226/72; F16C 2226/76; F16C 2226/78; F16C 2226/80; F16C 33/4635; F16C 2361/53; F16C 2361/61; F16C 19/26; F16C 33/3843; F16C 33/3875; F16C 33/4623; F16C 33/4641; F16C 33/4664; F16C 33/3881; F16C 33/3856; B21D 53/12; Y10T 29/49691
USPC ....... 384/572, 576–578, 523, 580, 539, 537, 384/470, 560, 538, 614, 618, 621, 623
See application file for complete search history.

(56) References Cited

U.S. PATENT DOCUMENTS 2,855,252 A * 10/1958 Budinger ............. B21D 39/037
138/156
4,239,304 A    12/1980 Wakunami
(Continued)

FOREIGN PATENT DOCUMENTS

DE    3041860 A1    6/1982
DE    3928913 A1    3/1990
(Continued)

OTHER PUBLICATIONS

Machine Translation of DE 4007452.*

*Primary Examiner* — Adam D Rogers
(74) *Attorney, Agent, or Firm* — Bryan Peckjian; SKF USA Inc. Patent Dept.

(57) ABSTRACT

A rolling-element bearing cage includes two axially spaced-apart side rings extending in a circumferential direction. Each side ring is split in the circumferential direction along at least one cutting line, thereby defining bordering surfaces on first and second bearing cage sections. A plurality of connecting bridges connects the side rings in an axial direction. First and second pairs of mutually-opposing first projections and corresponding first openings are disposed on the side rings along the bordering surfaces of the first and second bearing cage sections and fix the bordering surfaces to each other in at least first and second directions that are perpendicular to each other. A pair of a second projection and a corresponding second opening is disposed axially between the first and second pairs of first projections and first openings and fixes the bordering surfaces to each other in a third direction perpendicular to the first and second directions.

17 Claims, 4 Drawing Sheets

(56) References Cited

U.S. PATENT DOCUMENTS

| | | | |
|---|---|---|---|
| 4,397,507 A | | 8/1983 | Kraus et al. |
| 4,865,473 A | | 9/1989 | De Vito |
| 5,033,876 A | * | 7/1991 | Kraus .......................... 384/572 |
| 5,178,474 A | * | 1/1993 | Muntnich ........... F16C 33/4635 |
| | | | 384/572 |
| 6,206,575 B1 | | 3/2001 | Matsushita et al. |
| 6,367,980 B1 | | 4/2002 | Kobayashi |
| 6,835,000 B2 | * | 12/2004 | Hiramatsu et al. .......... 384/523 |
| 6,883,968 B2 | * | 4/2005 | Fugel .................... F16C 33/546 |
| | | | 384/577 |
| 8,894,293 B2 | * | 11/2014 | Beck .................. F16C 33/4694 |
| | | | 384/577 |
| 2008/0260317 A1 | | 10/2008 | Earthrowl et al. |

FOREIGN PATENT DOCUMENTS

| | | | | |
|---|---|---|---|---|
| DE | 3914056 C1 | | 8/1990 | |
| DE | 4007452 A1 | | 9/1991 | |
| DE | 19856024 A1 | | 6/2000 | |
| DE | 10011651 A1 | | 9/2001 | |
| DE | 10240282 A1 | | 3/2004 | |
| FR | 2918136 A1 | * | 1/2009 | .......... F16C 33/4635 |
| FR | 2918137 A1 | * | 1/2009 | .......... F16C 33/4635 |
| GB | 1296976 A | | 11/1972 | |
| JP | 56166321 U | | 12/1981 | |
| JP | 10281165 A | | 10/1998 | |
| JP | 2006177559 A | | 7/2006 | |

\* cited by examiner

SPLIT BEARING CAGE FOR ROLLING ELEMENT BEARING

TECHNICAL FIELD

The present invention relates to a split bearing cage, e.g., for rolling-element bearings, and a method for manufacturing such a bearing cage.

BACKGROUND ART

Bearing cages for rolling-element bearings are generally comprised of two axially-spaced-apart side rings and a plurality of bridges that connect the side rings and are disposed one behind the other in a circumferential direction of the bearing cage. Each pair of adjacent bridges forms a pocket for guiding a rolling element. The bearing cage thus holds the rolling elements spaced apart relative to each other, thereby preventing direct contact between neighboring rolling elements and thus reducing friction and heat generation in the bearing. The bearing cage also ensures a uniform distribution of the rolling elements around the entire circumference of the cage or rolling-element bearing and thus enables a uniform load distribution as well as a quiet and smooth running of the bearing.

Bearing cages are heavily stressed during operation due to frictional, strain and inertial forces. In addition, chemical degradation can occur under certain circumstances due to exposure to certain additives and substances. Design and material selection are therefore of critical importance for the operational reliability of the cage as well as for the operational efficiency of the bearing.

Rolling-element bearing cages typically comprise either pressed cages or solid cages. Pressed cages for rolling-element bearings are usually manufactured from sheet steel, in some cases also from sheet brass. Solid cages for rolling-element bearings can be manufactured, e.g., from brass, steel, aluminum, polymers or phenolic resin.

Solid polymer cages, which are often manufactured using an injection molding process, are characterized by an advantageous combination of strength and elasticity. Good sliding properties of plastic on lubricated steel surfaces and the smoothness of the cage surfaces in contact with the rolling elements lead to low cage friction, a correspondingly low heat generation in the bearing and barely measurable wear. The forces from the inertia of the cage also remain small due to the relatively low material density (as compared to heavier metal cages). The excellent running properties of polymer cages even under lubricant starvation conditions permit continued operation of the bearing for some time without risk of seizure and secondary damage.

For example, polyamide 66, polyamide 45, polyetheretherketone (PEEK), phenolic resin and other polymer materials can be used as the polymers for conventional injection-molded bearing cages.

Bearing cages are known in the prior art that have a through-slot along a cutting or parting line in the circumferential direction. The respective ends of the cage or side ring that border the cutting line are formed as bridges (circumferential bridges), which have projections and openings corresponding to one another in order to fix or couple the cage ends to each other, e.g., using a snap-fit connection. Such split rolling-element bearing cages, in which a "lock" or a "latch" attached to the cage ends secures or fixes the cage ends, can be used in many ways, such as for example for the bearing of balance shafts or for the bearing of gears on shafts in motor vehicles having a manual transmission.

In known split rolling-element bearing cages, however, the projections and openings on the cage ends are usually designed such that the cage ends are not held captive or fixed in at least one of the axial, radial, and tangential directions. As a consequence, such known connecting or fixing concepts for cage ends are disadvantageous in terms of their load bearing capacity and/or strength in at least one of the aforementioned directions.

SUMMARY

It is therefore an object of the present teachings to disclose an improved securing concept for a split bearing cage as well as for its manufacture.

In one aspect of the present teachings, opposing ends of first and second bearing cage sections of the split bearing cage (i.e. ends opposing along a cutting or separation line of the bearing cage) are secured or immovably fixed in at least two directions (e.g. radial and tangential, or axial and tangential) by using at least two pairs of mutually-opposing first projections and first openings (recesses or receptacles) formed in or on the opposing ends. Here, the at least two directions are selected from the axial, radial and tangential directions. The first (e.g., male) projections and the first corresponding (e.g., female) openings are formed in or on the cage or side ring ends of the first and the second bearing cage sections. They are preferably configured to provide an interlocking connection of the first and the second bearing cage sections in the at least two (mutually perpendicular) directions upon the insertion of the first projections into the corresponding first openings. In order to additionally fix the two bearing cage sections along the cutting line in a third direction perpendicular to the other two directions, at least one pair comprising a second projection and a second opening, which pair is formed to fix the two bearing cage sections additionally in the third direction, is further provided in the axial direction between the two pairs of mutually-opposing first projections and first openings formed in the side rings.

In another aspect of the present teachings, a bearing cage for a rolling-element bearing preferably comprises two axially spaced-apart side rings extending in a circumferential direction. The bearing cage is split in the circumferential direction along at least one cutting line between a first bearing cage section and a second bearing cage section. Pairs of mutually-opposing first projections and their corresponding first openings are formed in, at or on the side rings of the first and second bearing cage sections on bordering surfaces of the cutting line and are designed to fix or secure the bordering surfaces to one another in at least two directions (from the set of axial, radial, and tangential directions, e.g. radial and tangential or axial and tangential). Between the pairs of mutually-opposing first projections and first openings formed in the side rings, a pair comprising a second projection and a corresponding second opening is further provided, which pair is formed to fix or secure the bordering surfaces or bearing cage sections to one another additionally in a third direction (preferably different from the at least two directions, e.g., the axial or radial direction).

As will be understood, the three directions (radial, axial and tangential) are perpendicular to each other, such as for example one radial, one tangential and one axial direction.

According to another aspect of the present teachings, a first projection of the first bearing cage section can be oversized relative to or larger than its corresponding opening in the second bearing cage section. In this case, upon insertion of the first projection into the first opening, a releasable snap-fit connection or an interlocking connection of the two bearing cage sections can be formed, in order to fix the bearing cage sections to one another along the cutting line in the at least two directions, for example, but not limited to, both in the radial and tangential directions.

The pair comprising the second projection and its corresponding second opening disposed in the axial direction between the pairs of mutually-opposing first projections and first openings formed in the circumferential bridges can thus be formed to fix or secure the bearing cage sections additionally for example in the axial direction, i.e. in the direction of the rotational axis of the rotationally symmetrical bearing cage.

With split bearing cages according to exemplary embodiments of the present teachings, more stable and/or loadable connections of the two bearing cage sections can be achieved than with conventional split bearing cages. By aptly choosing the arrangement or design of the pair of first projections and first openings as well as by coordinating the arrangement or design of the at least one pair comprising the second projection and second opening, an interlocking connection of the bearing cage sections is achieved in the radial, tangential and axial directions, which connection is simultaneously loadable in all of these three directions. Even with bearing cages formed from polymer, a breaking of the projections and/or openings occurs less quickly by using exemplary embodiments of the present teachings than is the case with conventional split bearing cage assemblies.

According to another aspect of the present teachings, the first projections and openings formed in the bordering surfaces of the cutting line are formed opposite each other in the circumferential direction in the circumferential bridges, so that a first projection can be inserted into a first opening in the circumferential direction. In other words, this means that the side rings or circumferential bridges of the two bearing cage sections have bordering surfaces opposite each other in the tangential direction along the cutting line. The first projections or the corresponding first openings are formed in the bordering surfaces. This allows a mechanically simple and intuitive insertion of the first projections into the first openings, in order to connect the two separate bearing cage sections via their side ring ends, which are formed by circumferential bridges, in both the radial and tangential directions.

According to another aspect of the present teachings, a first projection formed in the bordering surface of the cutting line can have a suitable design for a releasable snap-fit connection with one of the first openings associated with the first projection. For example, the first projection can have a substantially semicircular to circular cross-section perpendicular to the rotational axis of the annular bearing cage. Accordingly, a first receptacle or opening associated with the first projection can have a spherical cross-section matched to the substantially semicircular to circular cross section, as viewed perpendicular to the rotational axis of the bearing cage, for the releasable snap-fit connection. Therefore, the first projection may, for example, have a spherical or hemispherical end section that can engage in a corresponding spherically-shaped receptacle or recess.

According to another aspect of the present teachings, the first projection formed on a bordering surface of the cutting line may extend predominantly in the axial direction. Its axial length is therefore greater than its dimensions in the tangential and/or radial direction. A first projection formed on the bordering surface of the cutting line can extend axially substantially corresponding to an axial extension of one of the associated or integrated circumferential bridges, and its end facing towards the cutting line can thereby be formed spherically or hemispherically. With such exemplary embodiments, it is understood that a first opening or receptacle corresponding to the first projection may be given a corresponding, complementary or inverse design to the design of the first projection. In case the first projection(s) and the associated first receptacle(s) (opening(s)) have a significant extension (length) in the axial direction, relatively high radial and tangential forces can be supported, without detachment of the connection between the bearing cage halves and/or breaking of the first receptacles and/or first projections.

The second projection disposed on a cage end in the axial direction between first projections can be, e.g., in the form of a step and can be oversized relative to, or larger than, the second opening in the axial direction. The second opening is axially disposed on the other cage end between the first openings, so that upon insertion of the second projection into the second opening a press-fit or an interlocking connection of the two ends of the bearing cage sections can be formed, thereby securing the bearing cage sections relative to each other along the cutting line in the axial direction as well. However, a small axial clearance between the second projection and the second opening can also be advantageous depending on the application, for example for easy manual assembly. A second projection disposed axially between the first projections reaches into a second opening corresponding to the second projection and is disposed axially between the first openings such that an axial immobilization or fixing of the two bearing cage sections relative to each other is ensured in this way.

Through the combination of the first projections and the first openings as well as the pair of the second projection and second opening, an immobilization, securing or fixing of the two bearing cage sections can be achieved in the radial and tangential (circumferential direction) directions, as well as in the axial direction.

The connection can be designed to be especially stable and/or loadable by advantageously shaping the second projection and the second opening. Thus, according to another aspect of the present teachings, the pair comprising the second projection and the second opening can extend in the axial direction substantially corresponding to the axial extension (length) of one of the connecting bridges connecting the side rings (circumferential bridges). That is, both the second projection and the corresponding second opening may approximately correspond to the axial length of a rolling element pocket disposed between the side rings (circumferential bridges). This axial length or extension can, according to some exemplary embodiments, amount to at least half of the total axial extension (length) of the bearing cage. Especially with such a significant axial extension (length) of the pair of the second projection and second opening, a highly loadable connection of bearing cage sections of split bearing cages can be achieved.

Although bearing cages can in principle be manufactured from various materials as was described above, exemplary embodiments comprise in particular split rolling-element bearing cages formed from plastic or polymer. In addition or the alternative, exemplary embodiments of the present teachings comprise rolling-element bearings having split rolling-element bearing cages according to any of the exemplary embodiments disclosed herein. The (e.g., polymer) cages can for example be manufactured using a polymer injection molding method.

In another aspect of the present teachings, a method for manufacturing a bearing cage may comprise forming at least one cutting line (line of separation) in the circumferential direction between a first and a second bearing cage section. Further, mutually-opposing pairs of first projections and first openings may be formed on or in bordering (adjacent) surfaces of side rings along the cutting line (line of separation) (i.e. in terminal end walls of the first and second bearing cage sections), and may be configured to fix the bordering (adjacent) surfaces to each other. Preferably, a first projection of the first bearing cage section is formed so as to be oversized relative to, or larger than, a corresponding first opening of the second bearing cage section. In such an embodiment, upon insertion of the first projection into the first opening, a snap-fit connection is formed between the bearing cage sections, thereby fixing the bearing cage sections along the cutting line in both the radial and tangential directions. The method may further include forming a pair comprising a second projection and a corresponding second opening in the axial direction between the pairs of mutually-opposing first projections and first openings, which are formed in the side rings, so as to be configured to fix or secure the bearing cage sections additionally in the axial direction. The second project and corresponding second opening may be formed in one or more connecting bridges connecting the side rings in the axial direction of the bearing cage.

Further objects, embodiments, designs and advantages of the present invention will become apparent upon reading the following detailed description and claims in view of the appended drawings.

DETAILED DESCRIPTION OF THE INVENTION

Figure 1:
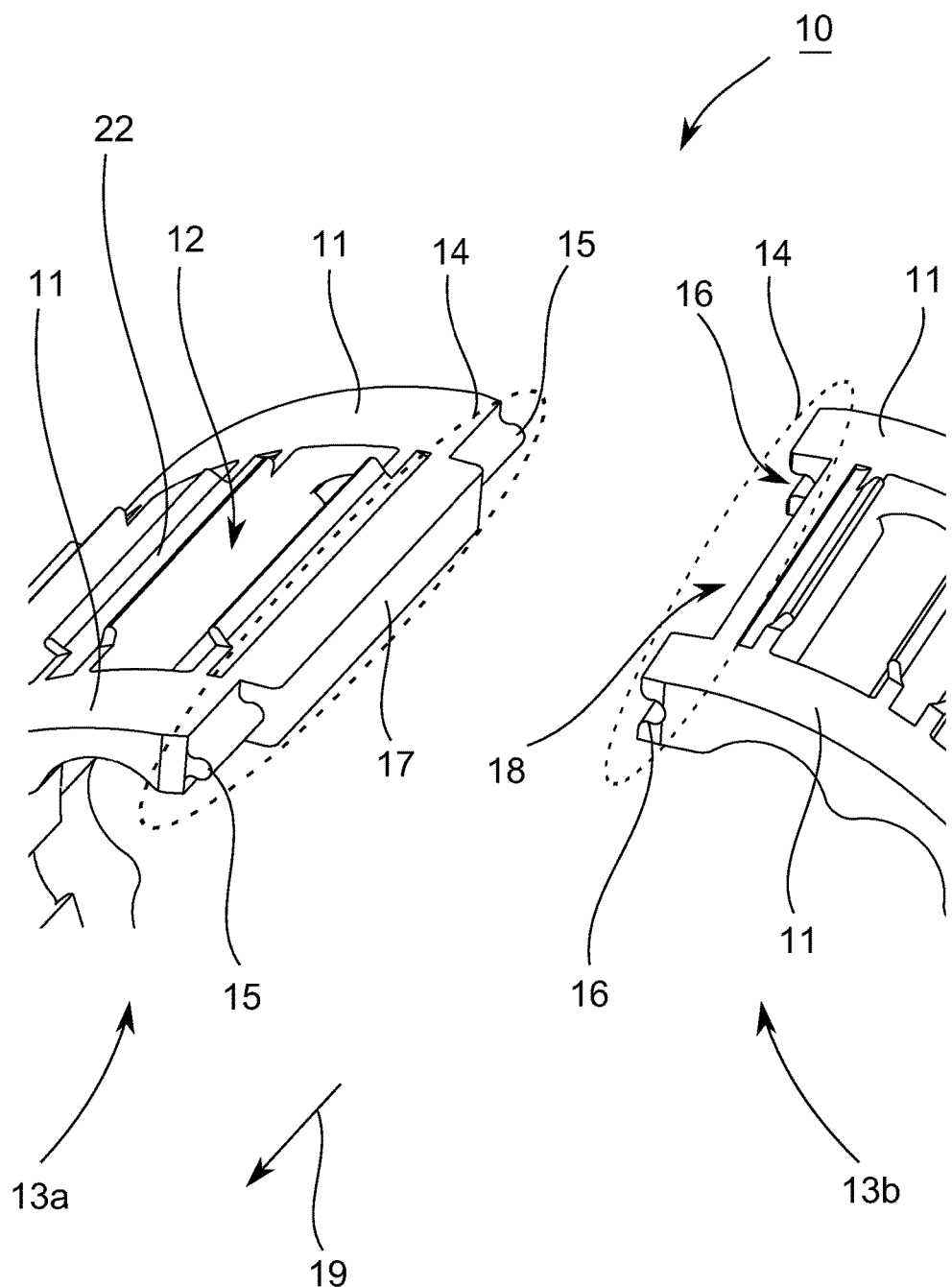
FIG. 1 shows a three-dimensional representation of a split bearing cage in the open state, according to an exemplary embodiment of the present teachings.

FIG. 1 shows a portion of a three-dimensional representation of a stepped split bearing cage 10 according to an exemplary embodiment of the present teachings.

Figure 4:
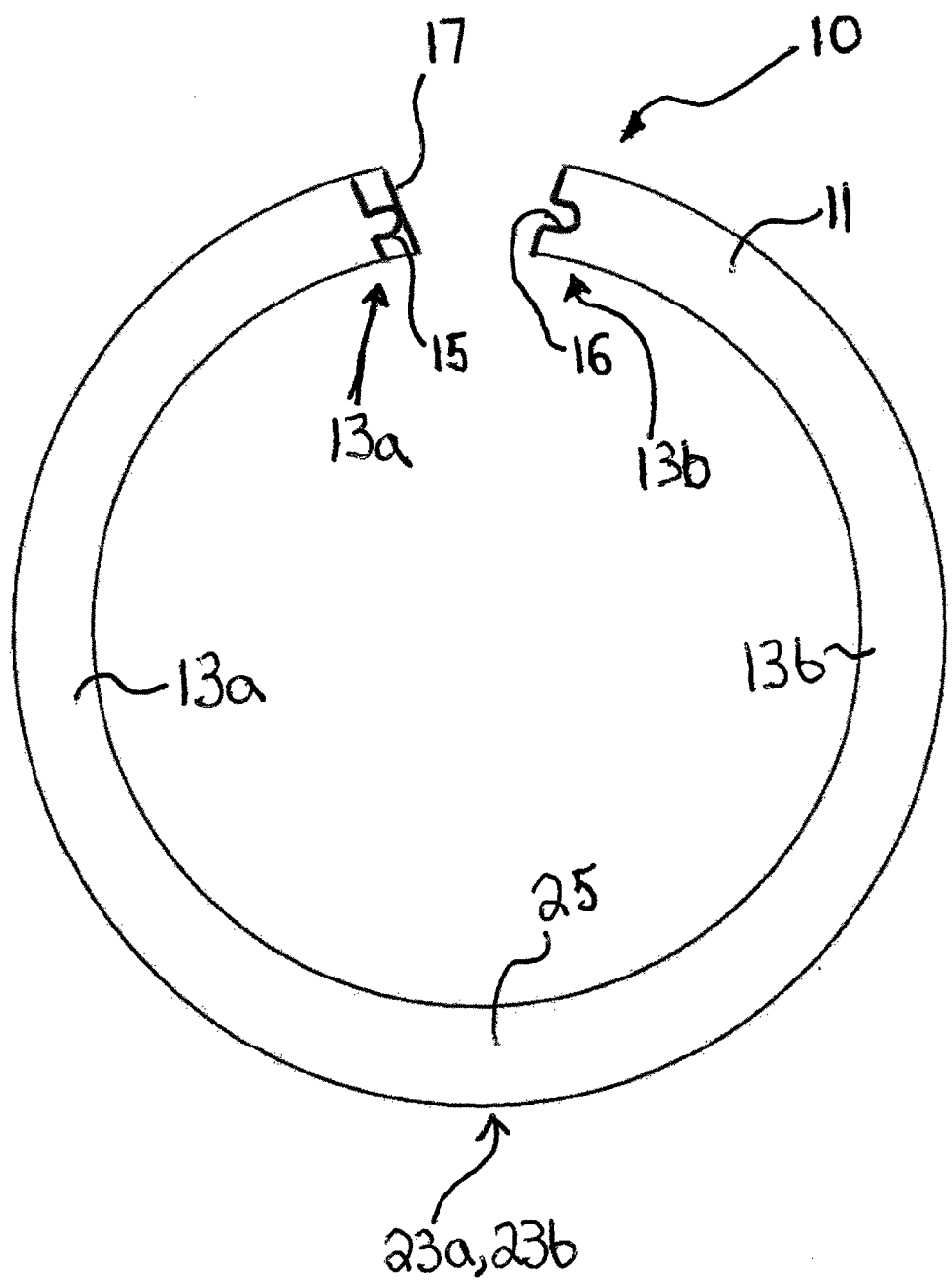
FIG. 4 shows a side elevational view of the split bearing cage according to a second embodiment of the present invention in which the first and second bearing cage sections are integrally connected together without a seam therebetween on and opposite of the split or gap formed by the cutting line.

The bearing cage 10 has two axially spaced side rings 11, each extending in the circumferential direction of the bearing cage 10. Pockets 12 for accommodating or guiding rolling elements (not shown for purposes of clarity) can be disposed between the side rings 11. The rolling elements may be, without limitation, e.g., balls, cylindrical rollers, tapered rollers, spherical rollers, etc. The split bearing cage 10 is split in the circumferential direction along at least one cutting line (line of separation), thereby forming a split or gap between first and second bearing cage sections 13a, 13b. Bearing cage sections 13a, 13b are defined as opposing and along the cutting or separation line of the bearing cage 10. It should be understood that the first and second bearing cage sections 13a, 13b may be integrally connected together without a seam therebetween on ends opposite of the split or gap (as shown in FIG. 4). Referring to FIG. 4, ends 23a, 23B of the first and second bearing cage sections 13a, 13b, respectively, are shown integrally connected without a seam therebetween along area 25 of the cage 10. As such, in this embodiment, the cutting line extends only through one arcuate location along the circumference of the bearing cage. Also, as referred to hereinbelow, the "tangential direction" is intended to mean a tangent to the circumference or circumferential direction of the bearing cage 10.

On the left and right sides, i.e. on the bordering (adjacent) surfaces 14 of the cutting line corresponding to bearing cage sections 13a and 13b, two pairs of mutually-opposing first projections 15 and first openings 16 are respectively formed in the side rings 11 of the first and the second bearing cage sections 13a, 13b. The first projections 15 and first openings 16 are configured to immovably fix or secure the bordering surfaces 14 (or the two bearing cage sections 13a, 13b) relative to each other. The first projection 15 of the first bearing cage section 13a may be oversized relative to, or larger than, the corresponding first opening 16 of the second bearing cage section 13b, so that upon insertion of the first projection 15 into the first opening 16, a (releasable) snap-fit connection of the two bearing cage sections 13a, 13b is formed that immovably fixes the bearing cage sections 13a, 13b to each other along the cutting line, e.g., in both the radial and tangential directions.

That is, each first projection 15 of the first bearing cage section 13a and its corresponding first opening 16 of the second bearing cage section 13b can be configured to fix the bearing cage sections 13a, 13b to each other along the cutting line in the radial as well as the tangential directions. In this case, the projections 15 and the corresponding openings 16 can extend in the axial direction along the respective bordering surfaces 14. However, it is also possible, e.g., that each first projection 15 of the first bearing cage segment 13a and each corresponding first opening 16 of the second bearing cage segment 13b are configured instead to fix the bearing cage sections 13a, 13b to each other along the cutting line in both the axial and the tangential directions. In this case, the projections 15 and the corresponding openings 16 could extend along the respective bordering surfaces 14 rotated by 90°, i.e. in the radial direction.

In the axial direction between the pairs of mutually-opposing first projections 15 and first openings 16 formed in the side rings 11, a pair comprising a second projection 17 and a corresponding second opening 18 is also provided, e.g., along or on one or more connecting bridges 22 extending axially between the two side rings 11. This pair 17, 18 is preferably configured to fix the bearing cage sections 13a, 13b additionally in the axial direction, i.e. in the direction of the axis of rotation, indicated with reference number 19, of the bearing cage 10. That is, the second projection 17 of the first bearing cage section 13a and the corresponding second opening 18 of the second bearing cage section 13b can also be configured to fix the bearing cage sections 13a, 13b to each other in the axial direction along the cutting line, i.e. so as to prevent relative movement in the axial direction. The second projection may have a rectilinear shape and project in the circumferential direction (length a) a greater distance, relative to the cutting line, than an apex of the pair of mutually opposing first projections. The second projection may further have a first axial width that at least substantially corresponds to an axial extension of one of the connecting bridges, the first axial width of the second projection configured to be longer than a second axial width of the second opening such that an interference fit is provided therebetween.

However, for example, if the bearing cage sections 13a, 13b are axially and tangentially fixed by the first projections 15 and the corresponding first openings 16, it is also possible that the second projection 17 of the first bearing cage section 13a and the corresponding second opening 18 of the second bearing cage section 13b are each configured to fix the bearing cage sections 13a, 13b along the cutting line in a third perpendicular direction, i.e. in the radial direction. In this case, the second projection 17 and the second opening 18 must be formed in a corresponding manner. For a radial fixing, however, they should not extend in the radial direction above the total height of the bearing cage sections 13a, 13b (contrary to the illustration in FIG. 1), but only over a part thereof, as is the case with the illustrated projections 15 and openings 16.

The respective first projections 15 formed on or in the bearing cage section ends and the corresponding first openings 15 form a detachable lock or latch attached to, or defined by, the bearing cage section ends. This detachable lock or latch secures or fixes the cage ends or the bearing cage sections 13a, 13b. As can be seen from FIG. 1, the first projections 15 and the first openings 16 formed on or in the respective bordering surfaces 14 along the cutting line can each be formed, in the circumferential and tangential directions, in an opposing manner on radially-extending walls of the side rings 11, so that one of the first projections 15 may be inserted into one of the first openings 16 in the circumferential or tangential direction. Expressed in other words, the first projections 15 as well as the first openings 16 can point, or substantially point, in the circumferential or tangential direction along the cutting line.

It should be understood that the arrangement illustrated in FIG. 1 represents only one of numerous possible exemplary embodiments. As one exemplary variation of the present teachings, the first projections 15 and the first openings 16 do not also need to be associated, as illustrated in FIG. 1, with different bearing cage sections 13a, 13b. As another example, the second projection 17 of the bearing cage section 13a, which forms a step in the split, could also be disposed axially between a first projection 15 and a first opening 16 on the bearing cage section 13a. Accordingly, the second opening 18 of the bearing cage segment 13b could also be disposed axially between a first projection 15 and a first opening 16, both of which are associated with bearing cage segment 13b. Expressed in other words, this means that there are also exemplary embodiments in which a first projection 15 and a first opening 16 can be formed on or in one and the same bearing cage section. In addition or in the alternative, the second projection 17 may be formed on bearing cage section 13b and the second opening 18 may be formed on the bearing cage section 13a.

Figure 2:
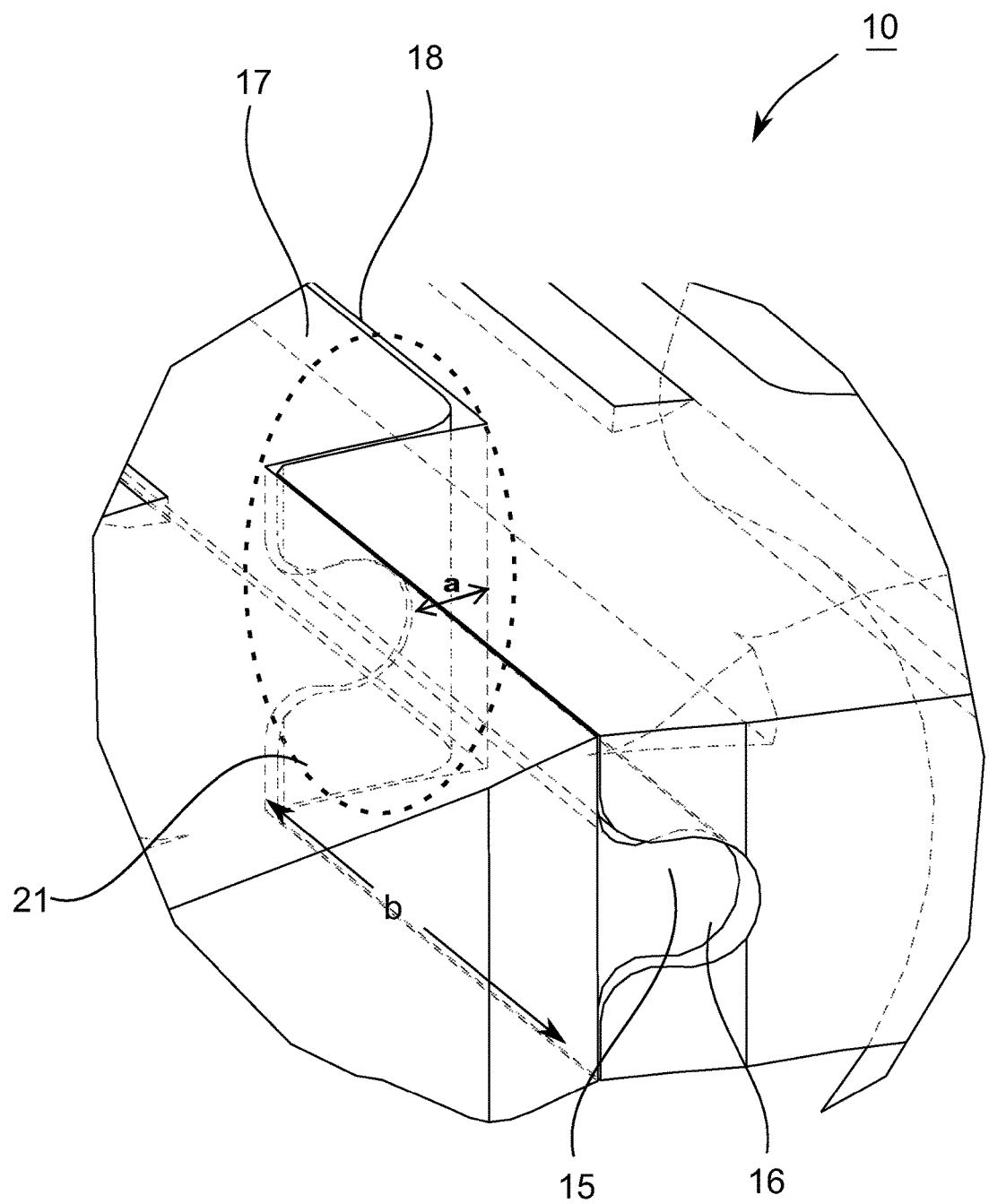
FIG. 2 shows an enlarged three-dimensional representation of a representative lock for the split bearing cage according to FIG. 1 in the closed state.
Figure 3:
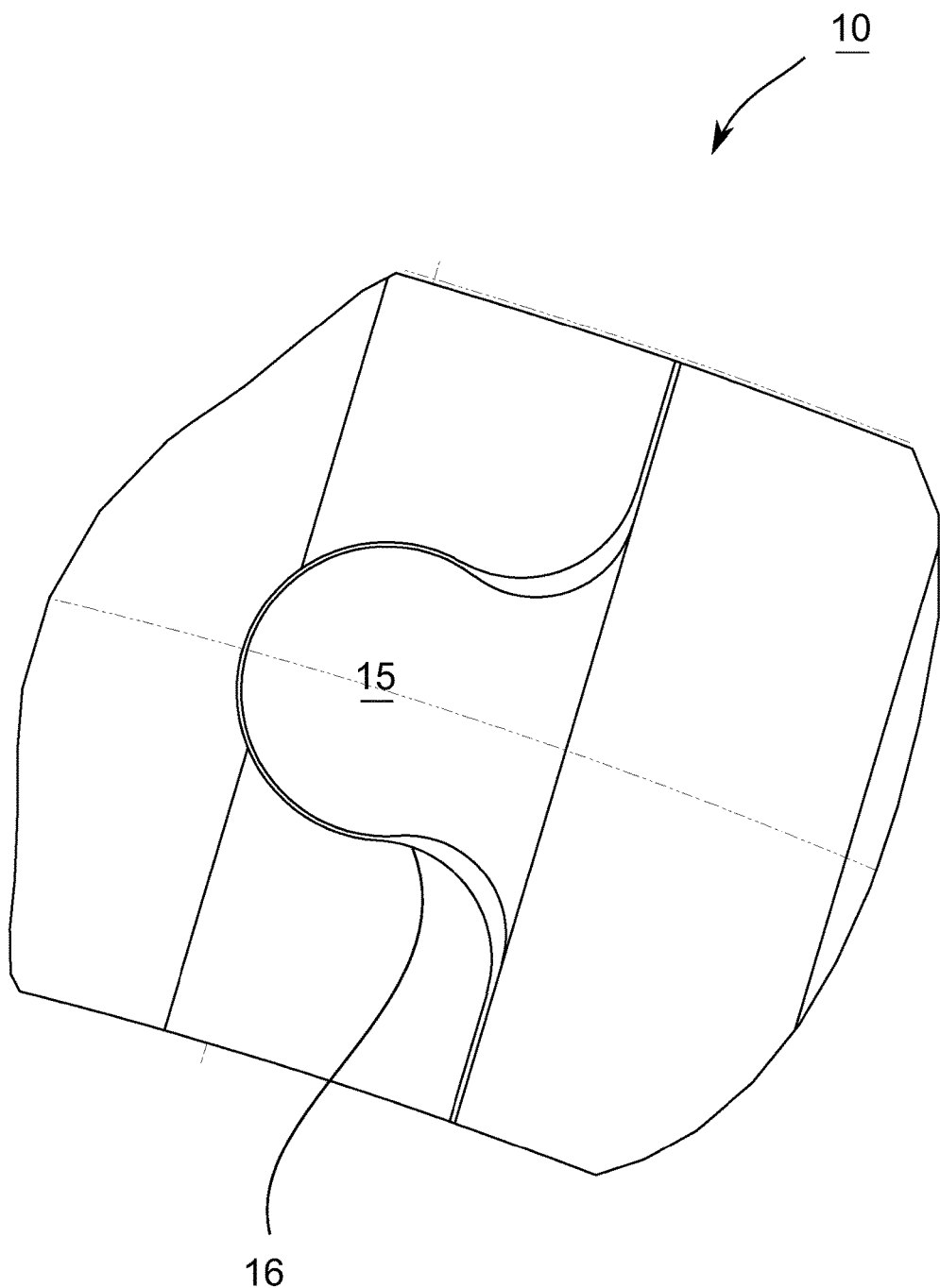
FIG. 3 shows an enlarged two-dimensional representation of the lock of FIG. 2 in the closed state.

As can be seen from FIG. 1 and especially from the enlarged illustrations of FIGS. 2 and 3, a first projection 15 formed on the bordering surface 14 of the cutting line can have, for example, a substantially semicircular to circular cross-section (as viewed perpendicular to the rotational axis 19 of the bearing cage 10). In addition, a first opening or receptacle 16, which is disposed on an opposing cage section end and is associated with the first projection 15, can have, e.g., a spherical cross section matched to the substantially semicircular or circular cross section (perpendicular to the rotational axis 19 of the bearing cage 10).

One or both of the first projection(s) 15 and/or the associated, opposing first opening(s) 16 is/are preferably configured to be elastically deformable to a sufficient extent, so that upon insertion of the (male) first projection 15 into the corresponding (female) first opening 16 at least one of the two components deforms elastically. In this case, an interlocking press-fit or to a snap-fit connection is possible between a first projection 15 and a first opening 16 (see FIG. 3). Owing to the semicircular to circular cross-section of the projection(s) 15 (the shape corresponding to the opening 16), a high loadability of the bearing cage section connection is ensured in the tangential direction.

In certain exemplary embodiments, the axial extension (i.e. the extension or length in the axial direction) or dimension of the first projection 15 can be advantageously chosen to be larger than its extension or length in the radial and/or tangential direction(s). This also applies for the corresponding opening 16 in a corresponding manner.

It can be seen, in particular with the assistance of the three-dimensional views of FIGS. 1 and 2, that a first projection 15 formed on the bordering surface 14 of the cutting line can extend in the axial direction 19 so as to substantially correspond to the axial extension (length) b of a side ring (circumferential bridge) 11. That is, the axial extension of a first projection (or engaging portion) 15 can correspond approximately or precisely to the axial wall thickness b of the side ring 11. In some exemplary embodiments of the present teachings, this may constitute a not insignificant part of the total axial extension (length) of the stepped split bearing cage 10. For example, the axial extension of a first projection 15 (and thus also the axial extension of a corresponding first opening 16) could fall within a range from 1% to 30% of the total axial extension (length) of the bearing cage 10, and in particular within a range from 5% to 15% of this extension. This not insignificant axial extension of a pair comprising the first projection 15 and the first opening 16 can advantageously lead to a stable connection with a high loading capacity with respect to stresses in the radial and tangential directions, since forces acting in these directions can be distributed over relatively large projection and opening surfaces.

For the additional fixing of the two bearing cage sections 13a and 13b in the axial direction 19, at least one second projection 17 and at least one second opening 18 corresponding to the projection 17 are provided. The second projection 17 can be slightly oversized or larger in the axial direction relative to the second opening 18, so that upon insertion of the second projection 17 into the second opening 18, a (axial) press joining or a press or interference fit of the bearing cage sections 13a, 13b can be formed, which fixes the bearing cage sections 13a, 13b to each other in the axial direction along the cutting line. That is, the second projection 17 and the second opening 18 are dimensioned relative to each other such that a surface pressing occurs in the area indicated with the reference number 21 in FIG. 2 due to the (slight) axial oversize of the first projection 17.

However, exemplary embodiments are also possible, in which a (slight or small) axial clearance is present between the second projection 17 and the second opening 18. In the radial direction, the dimension or length of the second projection 17 and the corresponding second opening 18 can correspond to the radial height or wall thickness of the side rings 11 or the cage 10. In this way, costly manufacturing processes can be avoided.

According to some exemplary embodiments of the present teachings, the pair comprising the second projection 17 (step) and the corresponding second opening 18 can extend in the axial direction 19, substantially corresponding to an axial extension of one of the connecting bridges 22 connecting the circumferential bridges (side rings) 11. That is, the axial extension of the second projection 17 and/or the second corresponding opening 18 can substantially or exactly correspond to the axial extension (length) of the pockets 12 for accommodating the rolling elements, which pockets 12 are bounded by the connecting bridges 22. In some exemplary embodiments, this can be a quite significant extension, measured in terms of the total axial extension (length0 of the bearing cage 10, whereby a very stable coupling of the two bearing cage sections 13a, 13b can be achieved, especially in the axial direction. For example the axial extension of the second projection 17 (and therewith also the axial extension of the corresponding second opening 18) could fall within the range from 40% to 98% of the total axial extension of the bearing cage and in particular within the range from 70% to 90% of this extension. With the first projections 15 and openings 16 or the bearing cage sections 13a, 13b in the snapped state, the second projection 17 can thus act as a connecting bridge between the side rings 11. The second projection 17 preferably tightly fits into the second opening 18 in the axial direction so that relative axial movement between the bearing cage sections 13a, 13b is prevented.

Of course, the dimensions of the projections 15, 17 as well as the openings 16, 18 described in the present specification can also be chosen quite differently, in order to adapt a stepped split bearing cage design to the radial, tangential, and/or axial loads of a particular application of the present teachings. Thus, for example, a plurality of adjacently-disposed second projections 17 could also be disposed between the axially external first projections 15 instead of a single second projection 17. The same also applies for the corresponding second openings 18.

Exemplary embodiments of the split bearing cage 10 described herein can for example be manufactured from a plastic material, such as a polymer. For example, the stepped split bearing cage 10 can be manufactured using a polymer injection-molding process. With only one cutting line in an annular bearing cage, the bearing cage 10 can also be a one-piece injection molded component.

It is self-evident that stepped split bearing cages in accordance with the present teachings can be used in rolling-element bearings, so that exemplary embodiments of the present teachings also comprise rolling-element bearings having bearing cages in accordance herewith.

In summary, the above-described exemplary embodiments of the present teachings generally relate to a stepped split polymer cage having a detachable lock or latch. The stepped split-shape can ensure a fixing of the open sides or sections in the axial direction and prevent a relative displacement. The lock (latch), which comprises e.g., the first openings 16 on a front side and the first projections 15 on an opposing side, can prevent a gap and ensure an interference-fit or press-fit between open slot sides after a "radial/axial snapping-on of a roller-and-cage assembly onto a shaft" mounting process. Thus the combination "stepped split+lock" provides a fixing of the bearing cage section in the axial, radial, and tangential directions.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cages, rolling element bearings and methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST 10 split bearing cage
11 side ring, circumferential bridge
12 pocket for rolling elements
13a, 13b first and second bearing cage sections
14 bordering surface
15 first projection
16 first opening
17 second projection
18 second opening
19 rotational axis
21 press-fit
22 connecting bridge
23a, 23b ends opposite the split or gap of the first and second bearing cage sections, respectively
25 area along bearing cage where ends of the first and second bearing cage sections opposite from the split are integrally formed without a seam therebetween
a circumferential projection length of second projection
b axial wall thickness of side ring

The invention claimed is:

1. A bearing cage for a rolling-element bearing comprising:
   first and second axially spaced-apart side rings extending in a circumferential direction, each side ring being split along a cutting line at a single circumferential location, thereby defining bordering surfaces on first and second bearing cage sections, ends of the first and second bearing cage sections which are located generally diametrically opposite from the cutting line being integrally connected without a seam therebetween such that the cutting line defines a single seam within the bearing cage when the bordering surfaces on the first and second bearing cage sections are abutting,
   a plurality of connecting bridges connecting the side rings in an axial direction,
   a pair of mutually-opposing first projections and corresponding first openings disposed on the side rings along the bordering surfaces of the first and second bearing cage sections, the pair of mutually-opposing first projections and corresponding first openings being configured to fix the bordering surfaces to each other in at least first and second directions that are perpendicular to each other, and a second projection and a corresponding second opening disposed axially between the pair of mutually-opposing first projections and first openings, the second projection and second opening being configured to fix the bordering surfaces to each other in a third direction perpendicular to the first and second directions, the second projection having a rectilinear shape and projecting in the circumferential direction a greater distance, relative to the cutting line, than an apex of the pair of mutually opposing first projections, and the second projection having a first axial width corresponding to an axial extension of one of the connecting bridges, the first axial width of the second projection configured to be longer than a second axial width of the second opening such that an interference fit is provided therebetween.

2. The bearing cage according to claim 1, wherein:
the first projections of the first bearing cage section are larger than the first openings of the second bearing cage section such that, upon insertion of the first projections into the first openings, a snap-fit connection of the bearing cage sections is formed.

3. The bearing cage according to claim 2, wherein the first direction is a tangential direction of the bearing cage, the second direction is one of the axial direction and a radial direction of the bearing cage and the third direction is the other of the axial direction and the radial direction.

4. The bearing cage according claim 3, wherein the first projections and the corresponding first openings are opposingly formed in the side rings on the bordering surfaces along the cutting line and extend in the circumferential direction, so that the first projections are pushable into the corresponding first openings in the circumferential direction.

5. The bearing cage according to claim 4, wherein the first projections have a substantially semicircular to circular cross-section perpendicular to a rotational axis of the bearing cage, and the first openings have a spherical cross-section matching the substantially semicircular to circular cross-section and are perpendicular to the rotational axis of the bearing cage.

6. The bearing cage according to claim 5, wherein an axial extension of each first projection corresponds to an axial extension of the respective side ring.

7. The bearing cage according to claim 6, wherein the second projection is larger in the axial direction than the corresponding second opening such that, upon insertion of the second projection into the second opening, a press-fit of the bearing cage sections is formed that fixes the bearing cage sections to each other in the axial direction.

8. The bearing cage according to claim 7, wherein the first axial width of the second projection and the second axial width of the corresponding second opening fall within the range from seventy percent (70%) to ninety percent (90%) of a total axial width of the bearing cage.

9. The bearing cage according to claim 8, which comprises a polymer material and is formed in one integral piece.

10. A rolling-element bearing comprising:
a bearing cage according to claim 9, and
a plurality of rolling elements respectively disposed in pockets defined between adjacent connecting bridges.

11. The bearing cage according to claim 1, wherein the first direction is a tangential direction of the bearing cage, the second direction is one of the axial direction and a radial direction of the bearing cage and the third direction is the other of the axial direction and the radial direction.

12. The bearing cage according claim 1, wherein the first projections and the corresponding first openings are opposingly formed in the side rings on the bordering surfaces along the cutting line and extend in the circumferential direction, so that the first projections are pushable into the corresponding first openings in the circumferential direction.

13. The bearing cage according to claim 1, wherein the first projections have a substantially semicircular to circular cross-section perpendicular to a rotational axis of the bearing cage, and the first openings have a spherical cross-section matching the substantially semicircular to circular cross-section.

14. The bearing cage according to claim 1, wherein an axial length of each first projection corresponds to an axial length of the respective side ring.

15. The bearing cage according to claim 1, wherein the first axial width of the second projection and the second axial width of the corresponding second opening fall within the range from seventy percent (70%) to ninety percent (90%) of a total axial width of the bearing cage.

16. The bearing cage according to claim 1, wherein each of the second projection and the corresponding second opening have an axial length corresponding to an axial length of one of the connecting bridges.

17. A rolling-element bearing comprising:
a bearing cage according to claim 1, and
a plurality of rolling elements respectively disposed in pockets defined between adjacent connecting bridges.

* * * * *